(12) United States Patent
Mahoney et al.

(10) Patent No.: US 7,635,409 B2
(45) Date of Patent: Dec. 22, 2009

(54) AIR DRYER SYSTEMS

(75) Inventors: Thomas John Mahoney, Elmwood Park, IL (US); Monte Salzman, Lake In The Hills, IL (US)

(73) Assignee: SKF USA Inc., Sullivan, IL (US)

( * ) Notice: Subject to any disclaimer, the term of this patent is extended or adjusted under 35 U.S.C. 154(b) by 332 days.

(21) Appl. No.: 11/684,161

(22) Filed: Mar. 9, 2007

(65) Prior Publication Data

US 2008/0216661 A1    Sep. 11, 2008

(51) Int. Cl.
*B01D 53/02* (2006.01)
(52) U.S. Cl. .............................. 96/133; 96/121; 96/147; 55/490
(58) Field of Classification Search .................. 96/133, 96/147, 121; 55/490
See application file for complete search history.

(56) References Cited

U.S. PATENT DOCUMENTS

| | | | |
|---|---|---|---|
| 291,190 A | 1/1884 | Isbell | |
| 3,892,551 A * | 7/1975 | Burnham | 96/115 |
| 4,062,129 A | 12/1977 | Yoshida et al. | |
| 4,108,617 A * | 8/1978 | Frantz | 96/114 |
| 4,413,426 A | 11/1983 | Graff | |
| 4,509,272 A | 4/1985 | Graff | |
| 4,733,543 A | 3/1988 | Blair | |
| 4,870,760 A | 10/1989 | Graff | |
| 5,209,764 A * | 5/1993 | Eberling | 96/114 |
| 5,378,266 A * | 1/1995 | Elamin | 96/114 |
| 5,607,500 A * | 3/1997 | Shamine et al. | 96/144 |
| 5,660,607 A * | 8/1997 | Jokschas et al. | 55/350.1 |
| 5,938,091 A | 8/1999 | Bergin et al. | |
| 5,961,698 A * | 10/1999 | Dossaji et al. | 96/130 |
| 5,983,516 A * | 11/1999 | Trapp et al. | 34/80 |
| 6,014,820 A * | 1/2000 | Jones et al. | 34/548 |
| 6,094,836 A * | 8/2000 | Mahoney et al. | 34/80 |
| 6,280,492 B1 * | 8/2001 | Binder et al. | 55/350.1 |
| 6,395,072 B2 | 5/2002 | Miura et al. | |
| 6,571,572 B2 | 6/2003 | Hobbs et al. | |
| 6,581,297 B1 * | 6/2003 | Ginder | 34/79 |
| 6,805,729 B2 | 10/2004 | Lim et al. | |
| 6,931,205 B2 | 8/2005 | Atkins | |
| 7,097,696 B2 | 8/2006 | Salzman et al. | |
| 2004/0045436 A1 * | 3/2004 | Quinn et al. | 95/121 |
| 2005/0188848 A1 * | 9/2005 | Salzman et al. | 96/134 |

* cited by examiner

*Primary Examiner*—Robert J Hill, Jr.
*Assistant Examiner*—Christopher P Jones
(74) *Attorney, Agent, or Firm*—Vedder Price P.C.

(57) ABSTRACT

An air drying system using plural air drying units. The system includes moist air and dry air plenums and a pair of substantially identical air drying canisters. Each unit has a single lower bases and a single, flanged mounting bracket. The moist air plenum is connected to an air inlet in the lower base, and the dry air plenum is connected to a dry air outlet in the lower base.

11 Claims, 4 Drawing Sheets

AIR DRYER SYSTEMS

BACKGROUND OF THE INVENTION

The present invention relates generally to air dryer systems, and particularly wherein the air dryer units are arranged in multiples of two. The problem of moisture in compressed air systems is well-known. It is known, for example that the reason that compressed air contains a great deal of moisture is that the process of compressing the air concentrates the same amount of moisture in a much smaller volume, thus raising the relative humidity of the compressed air.

For example, with such air dryers, three, four, or five such pairs or units of air dryers may be "modular" and used a group for purposes of accumulating large amounts of compressed air for use in paint spraying, compressed air tool use, tire inflation, and other applications.

The main advantage of the invention is a simplified mounting system for installing and removing the units. This system is a great improvement over a known prior method. According to the prior art, when a plurality of air dryer units are used as a group or arranged to work together, the installation was very complex. The method required piping the intake and outlet manifolds separately with individual pieces of pipe, and its accompanying problems. For example, each piece of pipe had to be cut to length, and installed using a large number of individual components.

Thus, the so called "black pipe" required each piece to be cut to length before installing. Then a tee was attached, after installing the tee to the desired length. Since there were right-angled pieces needed, this required a union for each length of pipe. Additionally, for each pair of prior art dryer units, among which there are a customary three, four, or five placed in series, the units must be mounted, almost always on a wall.

This was done using a plurality of rearwardly and upwardly extending brackets, mounting the brackets first to each pair of dryer units and then to the wall. This created additional alignment problems, which the present invention overcomes.

Thus, there were required for each of the moist air inlets, a tee, two nipples and a union for each pair of air dryers, and an end plug for the last tee. This arrangement was repeated for the dry air outlets. Thus, in an array of five pairs of dryers, there would be required ten tees, ten unions, two end caps, and twenty nipples, plus the usual array of "Teflon" tapes for each nipple end to insure that the joints were air-tight.

The present invention also overcomes these installation problems and shortcomings by utilizing one standard bracket for each pair of dryers, with each bracket having a downwardly directed vertical flange which easily slides within a pre-sized slot in a mounting strip having openings or slots just wider than the vertical flange. Accordingly, it is only necessary to place the units in their approximate positions with the flanges in the slots. Then, instead of cutting each piece of black pipe or the like to a selected, most likely different, length, the brackets predispose the matched pair of dryer units to be positioned such that they register immediately with a series of T-bolts disposed in the plenum of the manifold. The T-bolts are accordingly evenly spaced along the manifolds.

Accordingly, the manifold consists of two selected length rectangular tube portions, preferably of aluminum, and each selected length having T-bolts intended to register with the inlet and outlet openings on the dryer, and each T-bolt being fitted with two O-rings for example. Accordingly, it is only necessary first to have the mounting strip placed on the wall, then have the dryer units placed in the slots in the mounting strip which allows a certain limited amount of end play, if any, to be taken up. Then, the final arrangement is easily accomplished merely by fastening the T-bolts in place in the manifold.

Such a mounting system, for example, in the case of using three dryers, has cut the installlation time from four hours to a mere thirty minutes, for example. Another example of mounting five drying units gave a capacity of 400 cubic feet per minute of almost totally dry air.

Accordingly, it is an object of the present invention to provide an improved mounting system for a series of air dryers.

Another object of the invention is to provide a series of air dryers, which contain inlet and outlet openings that match the T-bolts used on the associated manifold.

A further object is to provide a simplified mounting strip for the dryer units which interfits with several vertical flanges, thus greatly simplifying assembly.

A still further object of the invention is to provide a plenum with a series of T-bolt connections, each one designed to enter the plenum at a desired spacing, thus allowing the plenum to register and form a manifold with the moist air or dry air ports in one part or another of the dryer base.

Another object is to provide a manifold having a plurality of inlets thereon, with each inlet being adapted to be received by a dryer unit, which in turn holds two drying canisters, each of which alternately allows moist air to enter and another which allows dry air to exit the unit.

A still further object is to provide a simplified manifold and bracket system.

A further object of the invention is to provide a system wherein all essential elements of the air dryers are positioned so as to be readily available for maintenance, replacement, and/or repair.

Another object of the invention is to provide a manifolding system which includes a plenum and suitable washers, such as O-rings, which are used in a simplified but effective assembly.

A further object of the invention is to provide several air dryer unit each containing twin canisters in which, when the first canister of the dryer unit is serving to absorb moisture from incoming air, the other canister uses a minor portion of that air to regenerate the desiccant contained in the second canister, and with the first and second canisters having their operations reversed in the next cycle.

SUMMARY OF THE INVENTION

The invention achieves its objects and other inherent objects, by providing an array of drier units, with each unit having a pair of spin-on canisters, a unitizing bracket with a vertical flange for interfitting with slots in a mounting strip, and two plenum secured to each dryer unit by a series of hollow T-bolts that register with openings in other parts of the dryer units.

The exact manner in which these and other objects and advantages of the invention are achieved in practice will become more clearly apparent when reference is made to the following detailed description of the preferred embodiment of the invention, and shown in the accompanying drawings, in which like reference numerals indicate corresponding parts throughout.

DESCRIPTION OF THE PREFERRED EMBODIMENTS OF THE INVENTION

The invention is capable of being practiced in a number of ways. However, a description will be given of one preferred embodiment of the invention, to which other variations and changes will occur to those skilled in the art.

Figure 1:
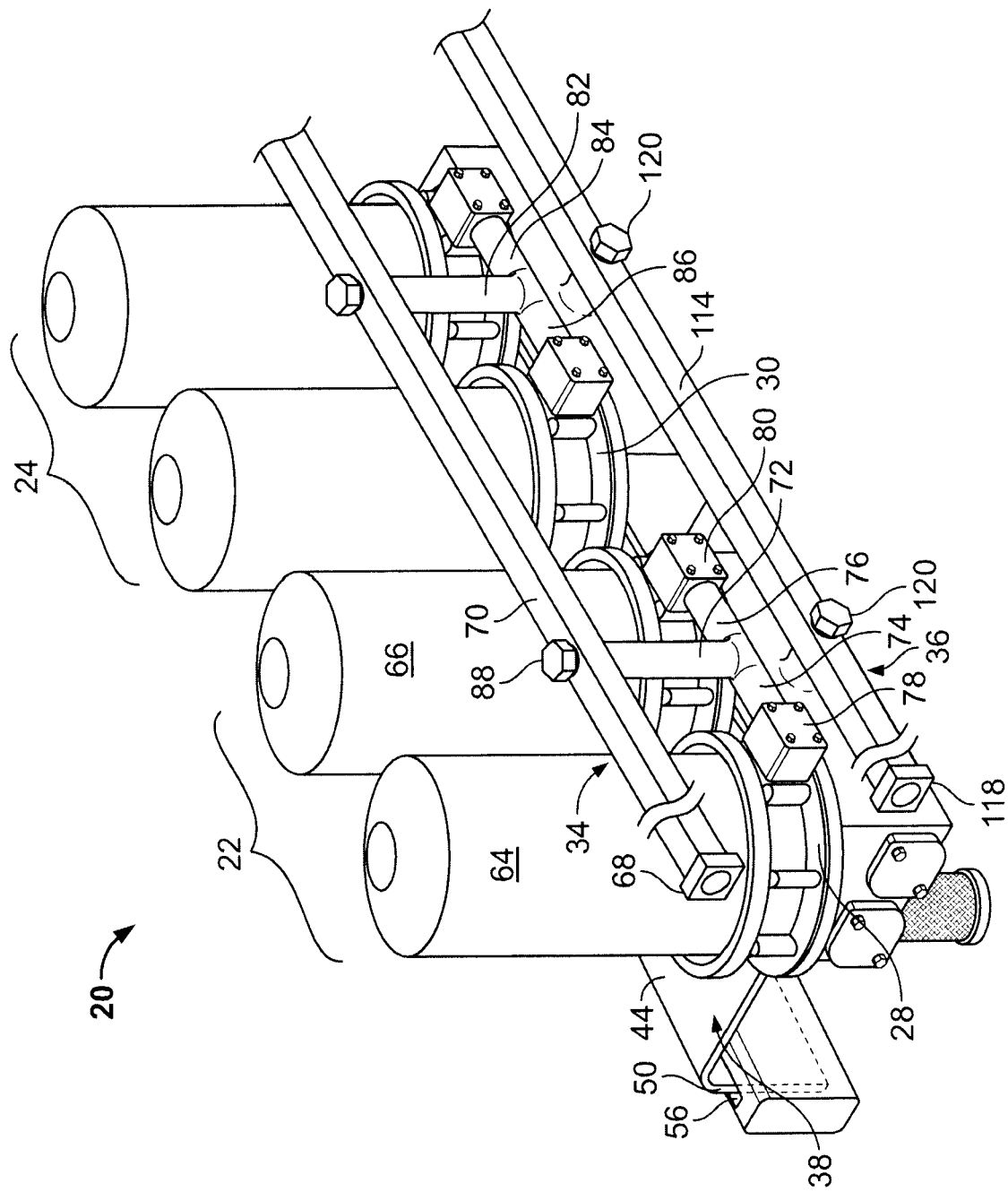
FIG. 1 is a perspective view showing a pair of dryer units, including their spin-on canisters, their bases, a mounting strip and associated brackets in a partially assembled relation and a moist air and a dry air manifold in assembled relation.
Figure 2:
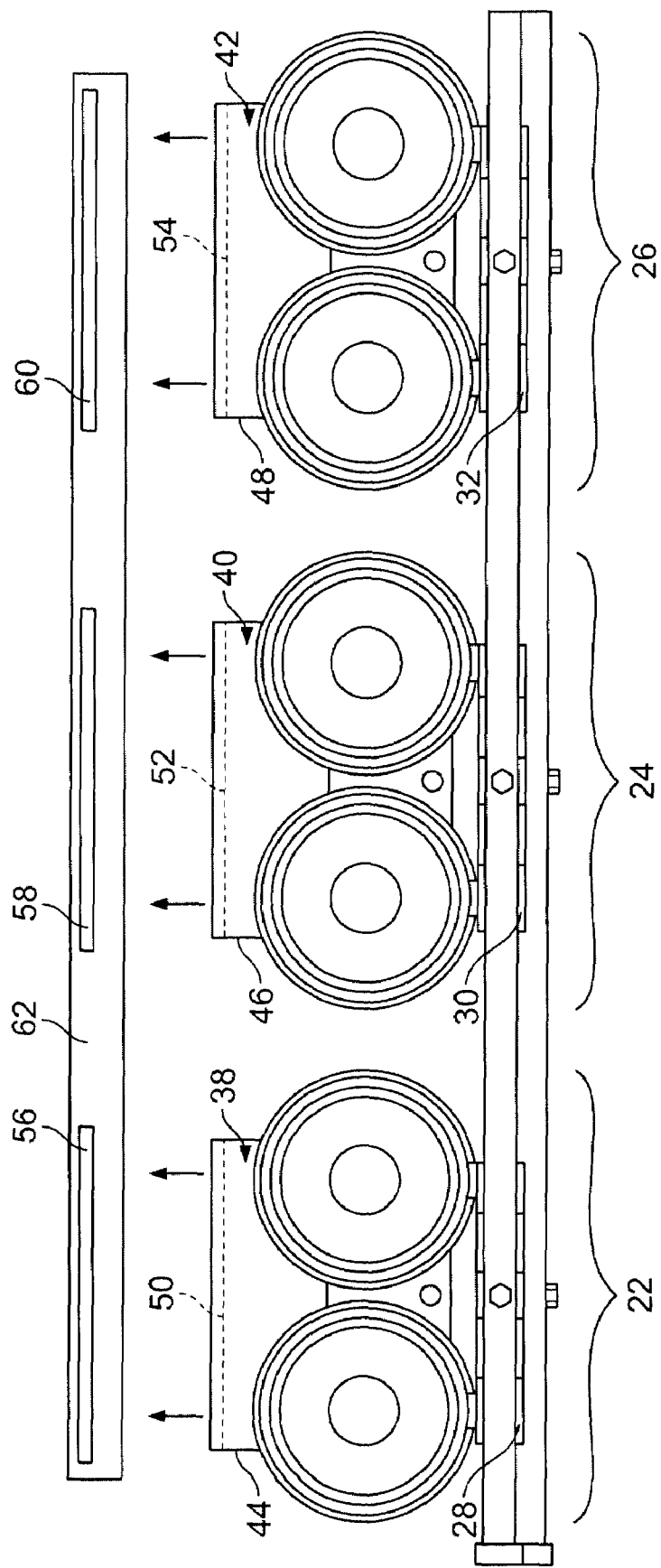
FIG. 2 is a top plan view showing several canisters, the two manifolds, and three mounting brackets in exploded relation to the mounting strip.
Figure 3:
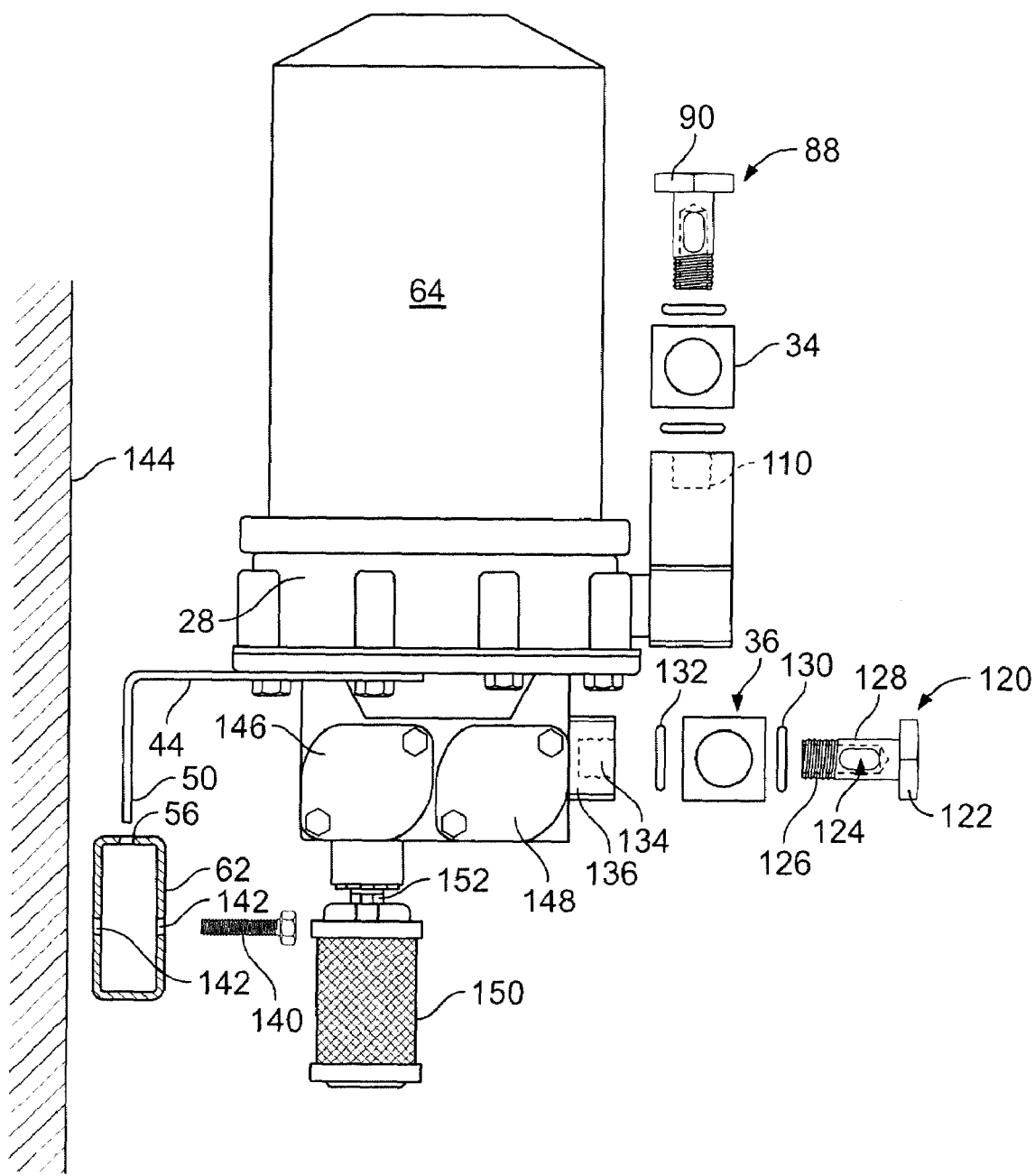
FIG. 3 is an end view, with partially exploded portions, showing a canister and base, a mounting flange, and components of two of the manifolds used in the completed installation.

Referring now in particular to FIGS. 1-3, there is shown an air drying arrangement generally designated 20 of plural air drying units generally designated 22, 24, 26, each unit including a common base generally designated 28, 30 and 32. (FIGS. 1 and 2).

The air dryer units as a whole include a dry air plenum generally designated 34 and a moist air plenum generally designated 36.

Each air drying unit 22, 24 26 has a bracket generally designated 38, 40, 42 which has a horizontally extending portion 44, 46, 48 and a vertical flange 50, 52, 54. The vertical flanges 50, 52, 54 fit into slots 56, 58, 60 in a mounting strip 62.

Referring again to FIGS. 1-3, each of the air drying units, such as the unit 22, includes a pair of canisters, 64, 66 mounted to a common base 28. Preferably, the canisters 64, 66 are of the spin-on type, which can be replaced easily, even though this is needed only every year or two. Each of the other bases 30, 32, etc. has its own bracket 40, 42 and each bracket has its own vertical flange 52, 54.

Referring now to FIG. 1, and in particular, to the dry air plenum generally designated 34, this plenum will be seen to include a plug 68 or fitting closing off the end of the manifold or plenum chamber 70 which extends horizontally toward a storage area (not shown) for air that has been dried. The plenum 70 is the main part of the manifold 34, which also includes an additional vertical passage 72, and this passage 72, extends down into a branched passage 74, 76 and ends up respectively in two boxed portions 78, 80.

These boxed portions 78, 80 lead into openings in the base 28. All of these passages and the manifold 34 amount to the means for passing dry air from the base 28 of the unit, as will be discussed.

The passages, 82, 84, 86 perform the same service in respect to the other base 30, and so on. In addition, a hollow T-bolt generally designated 88 (FIGS. 1 and 4) is shown with its head portion extending upwardly from the plenum 70 of the manifold 34.

Figure 4:
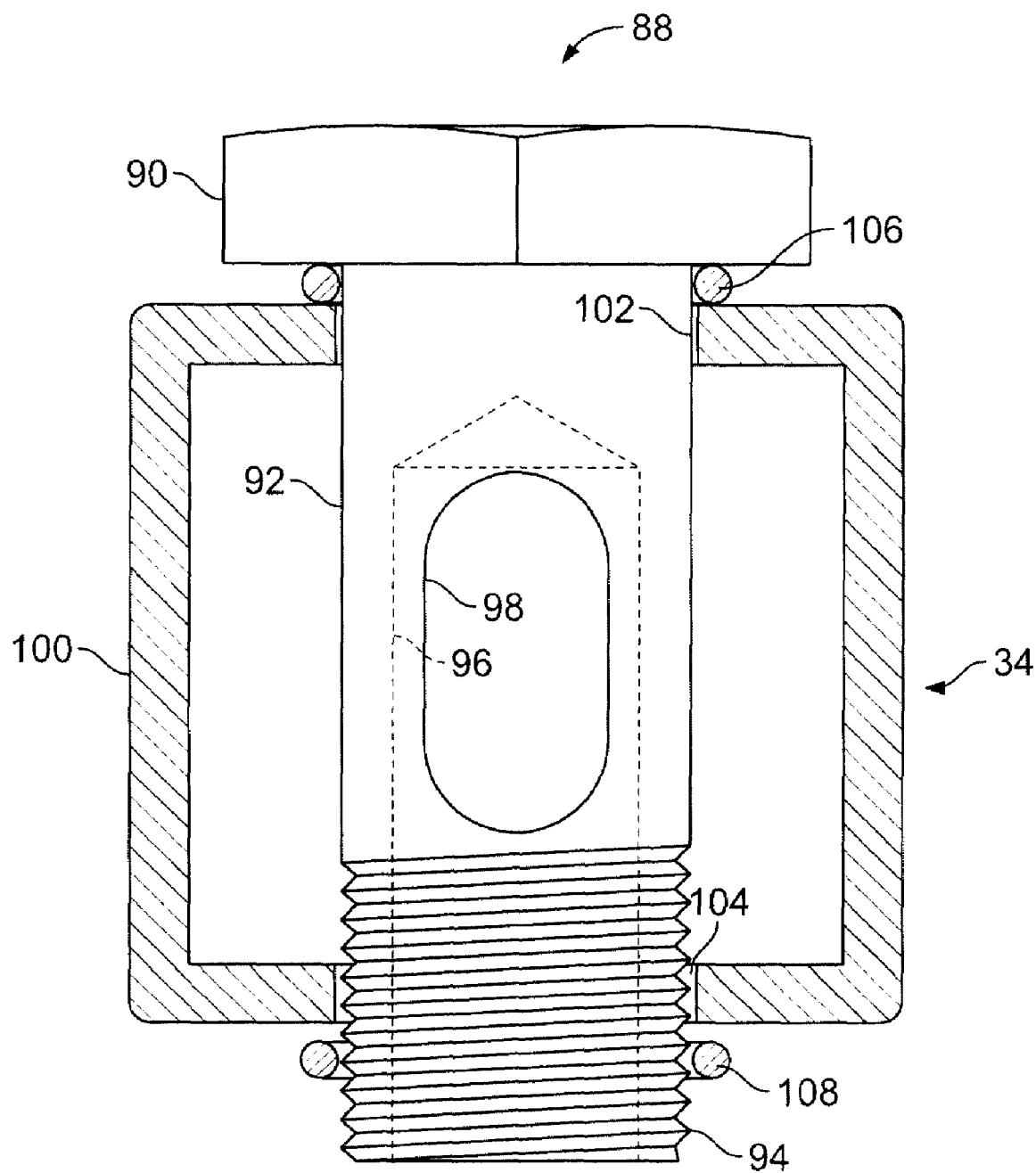
FIG. 4 is a greatly enlarged view, partly in elevation and partly in section, showing a T-bolt and a portion of the manifold.

FIGS. 3 and 4 show the make up of the T-bolt generally designated 88, and these parts include a head portion 90 preferably of a hexagonal shape, an intermediate shank portion 92, a threaded lower shank portion 94, and a hollow internal bore 96 with passage windows 98 therein. The sidewall portions 100 of the plenum 34 are represented in the FIG. 4 and there is, in addition to these parts, a pair of small cylindrical inlet passages, 102, 104 for accommodating the bolt 88. In addition, there are provided a pair of O rings, an upper O ring 106 and a lower O ring 108, to seal the plenum 70 of this manifold. The vertical passage portion 72 is hollow and includes a threaded portion 110 to engage the bottom, threaded part 94 of the T-bolt.

From the foregoing description, it can be appreciated that the hollow T-bolt 88 is passed through the openings 102, 104 in the plenum 34 and tightened down, entrapping the plenum 34 between the head portion 90 and the O rings 106, 108 as they engage the upper portion of the vertical passage 72. It can be further appreciated that with this configuration air is fed through plenum 34 through the hollow T-bolt 88 and then to the base.

Referring now to the bottom manifold generally designated 36, this manifold will be seen to be made up of a principal plenum generally designated 114, having a cap 18 on one end thereof and having a horizontally disposed T-bolt generally designated 120. The head 122 of the bolt, the window opening generally designated 124, the threaded part 126 of the shank 128 and the O rings 130, 132 are similar to their counterparts in the description of the plenum 34. In this case, the plenum 36 extends beneath and is spaced apart from the plenum 34. The threaded portion 126 of the T-bolt 120 extends into the threaded portion 134 of the stub passage 136.

Referring now to FIG. 3, there is shown somewhat schematically a bolt 140 which extends through openings 142 in the mounting strip 62. These fasteners extend into and are received by the wall 144, thereby holding the flanges 50, 52, etc. in place within the mounting strip 62.

The description of the operation of the canister 64, 66 and the air dryer as a whole is not a necessary part of the invention which is required to be described in detail. However, a few details of the invention will be set forth, such as the provision of end plates 146, 148 which are useful in replacing the valves, which operate to dry the air. A muffler 150 is placed at the end of a pair of outlets 152 to create a quiet environment.

The fact that these canisters are well-known in the art, such that the canister 64 dries moist air when it is coming in through the manifold 114, and thus serves to dry the air with the desiccant contained in one canister 64. The moist air from the other canister 66 is gradually being treated with a small amount of the bleed air from the drying canister to remove the accumulated moisture from the canister 66. Additional details of the manner in which these dryers operate are set forth in U.S. Pat. No. 7,097,696 B2, issued Aug. 29, 2006, which is incorporated herein by reference.

Assuming now that the installation is to be made, and the first step is to select a portion of the wall 144 in which the mounting strip 62 will be installed. A series of bolts or log screws 140 which extend through the passages of 142 is provided and a portion of the strip which will not interfere with the bracket 44, 46, etc. is selected. Thereupon the mounting strip is mounted horizontally with the bolts 140 secured in place. Next, the units 22, 24, etc. are moved into position with the brackets 44, 46, etc. being positioned over the openings 56, 58, etc. This approximately positions the units 22, 24, etc. in place, with the outer end portion of the horizontal flanges 44, 46 of the bracket resting on top of the mounting strip 62.

Thereupon, the T-bolts are fitted in their correct positions, passing through the manifolds 34, 36, and registering respectively with their vertical and horizontal portions, 72, 82, etc. The horizontal bolts 120, etc. pass through the stub portions 136 of the lower portion of the bases 28, 30, etc. and these are also secured in place. The arrangement allows a slight amount of end play which allows the units 22, 24 to be positioned exactly so that there is registry between the T-bolts and the openings. These are then tightened down and the installation is complete with no nipples, tees, unions or "Teflon" tape being needed, such as was required in the prior art. An exemplary mounting of 3 units 22, 24, etc. was completed in ½ hour, as opposed to 3 or 4 hours using the prior art method.

An arrangement has been described where there are two, three and four drying units 22, 24 and 26 arranged in a series. As many as five or six or even more of the units 20 may be disposed in a linear relation. It is also possible to mount the air dryers in two groups of two or three, etc. on different levels with the outlets of dry air 34 being supplied as a group, or plural groups, to an accumulator such as a compressed air storage tank.

Accordingly, the installation of such air dryers in an application is greatly simplified in regard to installation.

It will thus be seen that the present invention provides a novel arrangement of air dryers for use where a plurality of air dryers is called for. It will also be seen that the invention provides a novel arrangement of installing groups of air dryers, such grouped dryers thereby having a number of advantages and characteristics including those pointed out and others which are inherent in the invention.

What is claimed is:

1. In combination, plural air drying units, a moist air inlet plenum and a dry air outlet plenum, each of said air drying units including a pair of substantially identical air drying canisters and a single lower base, each of said single lower bases also including a single flanged mounting bracket, said moist air plenum being operatively associated with each of said bases by single moist air inlet means for each base, said inlet means being located at predetermined fixed intervals along said moist air plenum, said dry air plenum being operatively associated with each of said bases by single dry air outlet means for each base, said outlet means being located at predetermined fixed intervals along the dry air plenum, whereby incoming moist air is fed through said moist air plenum to said bases; and whereby said dry air is fed from said bases to a dry air facility located downstream of said dry air plenum.

2. A combination as set forth in claim 1 wherein said moist air plenum is made from tubing with a square or rectangular cross-section.

3. A combination as set forth in claim 1 wherein said dry air plenum is made from tubing with a square or rectangular cross-section.

4. A combination as set forth in claim 1 wherein both of said plenums are made from tubing with a square or rectangular cross-section.

5. A combination as set forth in claim 1 wherein each of said flanged brackets include a horizontal portion and a vertical flange extending downwardly from said horizontal portion, and wherein said combination further comprises a continuous mounting strip, said continuous mounting strip having plural separate openings in its upper face, said openings being slightly wider than the width of said vertical flanges to allow slight lateral adjustment to the exact position of one or more of said air drying units.

6. A combination as set forth in claim 1 wherein the moist air inlet for each base and the dry air outlet for each base includes hollow T-bolts for joining said moist air and said dry air plenums to said bases.

7. A combination as set forth in claim 1 wherein said plural air drying units comprise at least 3 air drying units.

8. A combination as set forth in claim 1 wherein said plural air drying units comprise at least 4 air drying units.

9. A combination as set forth in claim 1 wherein said plural air drying units comprise at least 4 air drying units on at least two different levels.

10. In combination, plural air drying units, a moist air inlet plenum and a dry air outlet plenum, each of said air drying units including a pair of substantially identical air drying canisters and a single lower base, each of said single lower bases also including a single flanged mounting bracket, said moist air plenum being rectangular in cross-section and being operatively associated with each of said bases by single moist air inlet means in the form of a hollow T-bolt for each base, said T-bolts being located at predetermined fixed intervals along said moist air plenum, said dry air plenum being rectangular in cross-section and operatively associated with each of said bases by single dry air outlet means in the form of a hollow T-bolt for each base, said T-bolts being located at predetermined fixed intervals along said dry air plenum, whereby incoming moist air is fed through said moist air plenum to said T-bolts and then to said bases; and whereby said dry air is fed from said bases through said T-bolts to a dry air plenum, and then to a dry air facility located downstream of said dry air plenum.

11. A combination as set forth in claim 10 wherein there is a mounting strip having plural openings therein for receiving said flanges on said brackets, said openings being just wider than said flanges, thereby helping to align said T-bolts and said bases.

* * * * *